Patented June 8, 1943

2,321,006

UNITED STATES PATENT OFFICE 2,321,006

CONVERSION OF NONBENZENOID HYDROCARBONS TO AROMATICS

Robert E. Burk and Everett C. Hughes, Cleveland Heights, Ohio, assignors to The Standard Oil Company, Cleveland, Ohio, a corporation of Ohio No Drawing. Original application March 21, 1939, Serial No. 263,198. Divided and this application October 19, 1939, Serial No. 300,238

3 Claims. (Cl. 260—668)

In the catalytic treatment of carbon-containing compounds, such as alcohols, hydrocarbons, etc., and particularly hydrocarbons, where the catalyst is of oxide type, a serious practical difficulty has been the tendency of the catalyst to coke up, thereby shortening the possible run, and adding to the difficulty of regenerating or cleaning, and even after regeneration has been effected to the greatest extent possible, the catalyst tends to lack a desirable standard of efficiency. We have found however that by providing catalyst compositions of the peculiar character set forth in detail below, the surprising result occurs that a catalyst does not tend to rapidly coke up such as in the case of the known oxide catalysts, and it regenerates more readily and provides high efficiency as regenerated.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the invention, the catalysts, of oxide character, are prepared such as to contain oxide of copper, this being in minor amount for the whole composition, and desirably where the catalyst is to be applied for aromatizing or dehydrogenating hydrocarbons, the other components may be oxides of aluminum and chromium. While copper-containing compositions may be employed in which the proportions of the other components vary considerably, it is preferable that aluminum oxide be in the range of 42.5–88.2 mol per cent, and chromium oxide in the range of 8.5–49 mol per cent, and the copper oxide 2–15 mol per cent and insofar as effective activity for such operations as aromatizing and dehydrogenating are concerned these ratios are rather critical. The compositions may be made by mixing copper oxides with chromium and aluminum oxide; by adsorbing or precipitating copper oxide on the surface of the chromium and aluminum oxide; or the copper constituent may be co-precipitated with the aluminum and chromium constituents by pouring solutions together, or better by stage-wise precipitation, in which precipitating action is first carried on with an insufficiency of the precipitant, and then as a second stage enough precipitant is brought into action to complete the precipitation. Gaseous and aqueous ammonia are especially desirable in this form of dual action. The catalyst is washed free of ammonia salts by decantation or preferably by filtration, and is dried in suitable manner. The catalyst may be dried by spreading out a thick layer and passing heated air over it, after which it may be broken up and screened. A further step of drying at elevated temperature, e. g. 400° F. or higher, with or without a vacuum is particularly desirable.

As illustrative of the preparation of the catalyst, the following may be noted:

I. 28 parts by weight of an oxide catalyst material containing 80 mol per cent to 20 mol per cent of the oxides of aluminum and chromium respectively, are moistened with 10 parts of a solution containing 2.43 parts of $Cu(NO_3)_2.3H_2O$. Ammonia gas is then applied to precipitate the copper. The catalyst is then washed and dried.

II. 125 per cent of a theoretical precipitating amount of ammonium hydroxide is poured into 3,000 parts of a solution containing 120 parts of ammonium acetate together with nitrates of aluminum, chromium and copper in proportions to furnish 78 mol per cent $Al_2O_3$, 20 mol per cent $Cr_2O_3$, and 2 mol per cent $CuO$. The mixture is allowed to stand about two hours, and it is then filtered and washed by filtration and dried.

III. By stage-wise precipitation, there is fed to a mixing zone 600 parts per minute of a solution containing 960 parts by weight of ammonium acetate, 6.24 mol aluminum nitrate, 1.6 mol of chromium nitrate, and 0.16 mol of copper nitrate per each 48,000 parts of solution, the mixing zone having a capacity of 600 parts of liquid, and gaseous ammonia is fed in, to 70 per cent neutralization, the overflow from this mixing zone proceeding to another mixing zone in which the solution is then further mixed with ammonium hydroxide at the rate of 680 parts concentrated $NH_4OH$ to each 16,000 parts of water and is fed at the rate of 200 parts per minute. The liquid proceeding from the second mixing zone is filtered at a rate substantially even with the precipitation rate. The catalyst is washed and dried.

In operation for instance in aromatizing hydrocarbons, these catalysts are active at temperature of 750–1250° F., and pressures of atmospheric up to about 400 pounds per square inch may be used. Hydrogen or part of the off-gases recycled may be used to dilute the feed hydrocarbons, which are supplied in vapor form. Thus, a catalyst of oxides of copper and aluminum and chromium in proportions of 2 mol and 78 mol and 20 mol per cent respectively, operating on naphtha from Michigan petroleum, with operating conditions of 932° F. and flow rate of 1 volume of liquid hydrocarbon per hour per volume of catalyst, yielded a product having a Kattwinkel test of 50 per cent. Again, a similar catalyst operating on re-run naphtha bottoms with similar operating conditions, gave a product having a Kattwinkel test of 67 per cent.

And in general, aliphatic hydrocarbons or paraffins and olefins and naphthenic hydrocarbons, naphthas, and distillates and non-benzenoid hydrocarbon stocks may be employed. It is of particular advantage for instance to fractionally divide a distillate into light and heavier portions or cuts, and subject these to the action of the catalyst, and then crack the heavier portion or cut, catalytically or thermally. It is desirable also to treat the product from the catalytic zone by separating aromatics formed, as for instance by a selective solvent such as liquid sulphur dioxide or of high boiling amine or a phenol, and re-pass the undissolved or non-benzenoid portion into contact with the catalyst. In general, the feed rates of the hydrocarbon to the catalyst may be 0.1 to 10 gallons per hours per gallon volume of catalyst.

These catalysts may be regenerated by subjecting to the action of oxygen-containing gas, such as air, or air diluted with nitrogen for instance, and the temperature of regeneration may be 750–1100° F. The carbon dioxide formed in such regeneration may be employed for heating the catalyst bed. It is remarkable that the present catalyst is not only regenerated readily, but continues to show little coke formation and even less than on the original catalyst.

This application is a division of our application Serial No. 263,198, filed March 21, 1939, now Patent No. 2,280,060; issued April 21, 1942.

Other modes of applying the principle of the invention may be employed, change being made as regards the details described, provided the features stated in any of the following claims, or the equivalent of such, be employed.

We therefore particularly point out and distinctly claim as our invention:

1. A process of converting hydrocarbons to aromatics, which comprises subjecting non-benzenoid hydrocarbons to the action of a contact mass characterized by 2–15 mol per cent of copper oxide with 42.5–88.2 mol per cent of gel type aluminum oxide which is co-precipitated with 8.5–49 mol per cent of chromium oxide, at 700–1250° F.

2. A process of converting hydrocarbons to aromatics, which comprises subjecting non-benzenoid hydrocarbons to the action of a contact mass characterized by 2–15 mol per cent of copper oxide with 42.5–88.2 mol per cent of gel type aluminum oxide which is co-precipitated with 8.5–49 mol per cent of chromium oxide, at 700–1250° F., separating aromatics from the product, and recontacting the non-benzenoid hydrocarbons of the product with the contact mass.

3. A process of converting hydrocarbons to aromatics, which comprises subjecting a petroleum distillate containing non-benzenoid hydrocarbons to the action of a contact mass characterized by 2–15 mol per cent of copper oxide with 42.5–88.2 mol per cent of gel type aluminum oxide which is co-precipitated with 8.5–49 mol per cent of chromium oxide, at 700–1250° F. and flow rate of 0.1–10 vol. of liquid per hour per vol. of contact mass.

ROBERT E. BURK.
EVERETT C. HUGHES.